June 16, 1936. R. E. SMITH Re. 20,013

HYDRAULIC HOIST LEVER CONSTRUCTION

Original Filed Oct. 9, 1931 3 Sheets-Sheet 1

RALPH E. SMITH, Inventor

By Toulmin & Toulmin

Attorneys

June 16, 1936. R. E. SMITH Re. 20,013

HYDRAULIC HOIST LEVER CONSTRUCTION

Original Filed Oct. 9, 1931 3 Sheets-Sheet 2

Inventor
RALPH E. SMITH,
By Toulmin & Toulmin
Attorneys

June 16, 1936. R. E. SMITH Re. 20,013

HYDRAULIC HOIST LEVER CONSTRUCTION

Original Filed Oct. 9, 1931 3 Sheets-Sheet 3

Inventor
RALPH E. SMITH,
By Toulmin & Toulmin
Attorneys.

Reissued June 16, 1936

Re. 20,013

UNITED STATES PATENT OFFICE 20,013

HYDRAULIC HOIST LEVER CONSTRUCTION

Ralph E. Smith, Galion, Ohio, assignor to The Galion Metallic Vault Company, Galion, Ohio, a corporation of Ohio Original No. 1,973,668, dated September 11, 1934, Serial No. 567,915, October 9, 1931. Application for reissue February 27, 1936, Serial No. 66,083

13 Claims. (Cl. 298—22)

This invention relates to improvements in hoists generally, and more particularly to hoists adapted to be used in connection with dump bodies. It is particularly the object of this invention to provide a hoist in which the application of power is along a straight line of thrust and acts upon a system of levers for hoisting some objects, among which may be a dump body of a truck.

It is also an object of this invention to provide an elevating mechanism contained within the supported frames forming a part of the structure which constitutes the support and also a part of the object to be elevated.

It is also an object of this invention to provide a straight line thrust which operates upon a system of levers, whereby there is a compound result, consisting of simple lever action and a toggle action.

It is also an object of this invention to apply the lifting force to a truck body well in advance of the center of gravity of the body, while at the same time permitting the pivoting of the body at the rear thereof and at the rear of the side frame so as to permit of maximum vertical elevation of the body with the engaging of the frame, while at the same time applying the lifting force in advance of the center of gravity of the body.

These and other advantages will appear from the following description taken in connection with the drawings, in which there is shown a preferred embodiment of the invention.

In the drawings:

Figure 5 is a section on the line 5—5 of Figure 2.

Figure 6 shows one end of the piston rod shaft with the hook thereon engaging beneath part of the trackway supporting that end of the shaft.

In the present instance, the hydraulic hoist mechanism is shown used in connection with a dump truck, but this mechanism may be used for other purposes.

Figure 1:
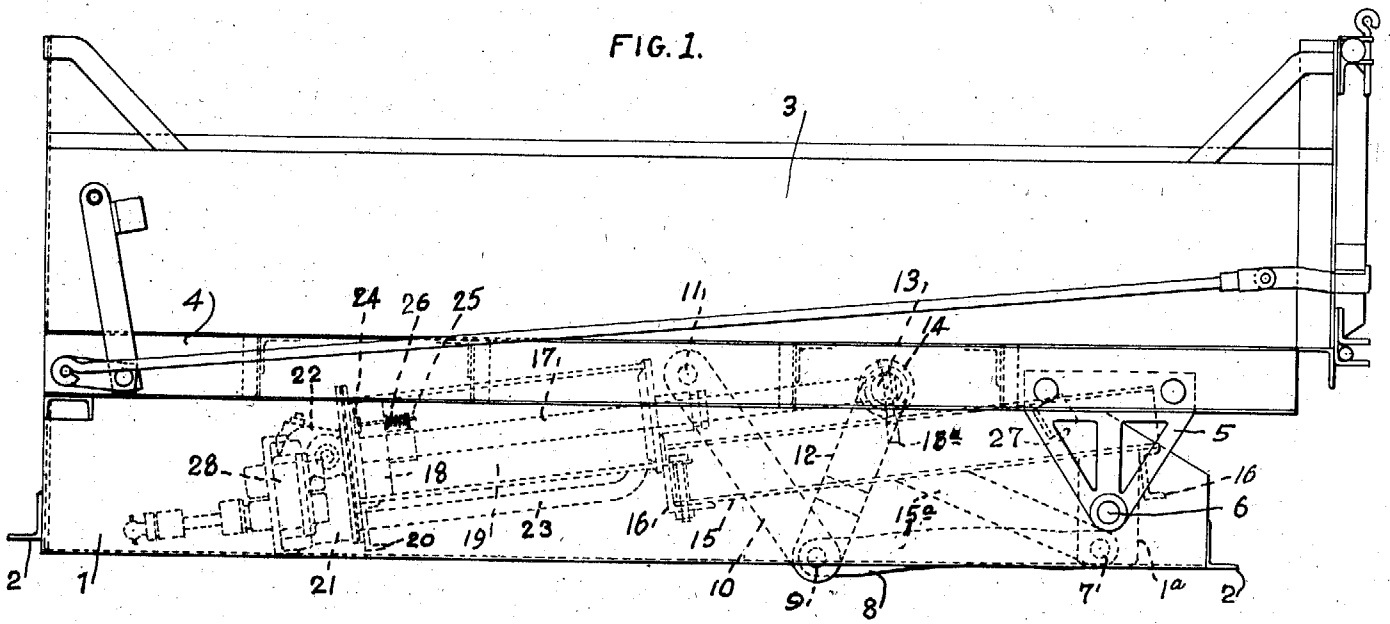
Figure 1 is a side elevation of a truck frame with the dump body mounted thereon, showing in dotted lines the dumping mechanism.

The numeral 1 is used to designate side bars of a frame supported on the truck, and forming a part of a housing for containing the dumping mechanism. These side bars are connected at each end by means of angle irons 2. Supported on the side bars and the frame formed thereby is a dump body 3, which has on each side and on the bottom thereof a side bar 4. These side bars with the side bars 1 form a complete housing and casing for the dumping mechanism, and conceal and protect the same when the body is in horizontal position as shown in Figure 1. In position as shown in Figure 1, the dumping body rests on top of side bars 1. Adjacent the rear end of the body and attached to the side bars 4 are brackets 5, one on each side. These brackets are V-shaped, and have at their lower ends holes through which a shaft 6 extends. This shaft is supported in the side bars 1 of the frame.

At each side of the frame, below the shaft 6 and supported on the side bar 1 and a bracket 1a, is a shaft 7 which has attached adjacent its inner end thereof, one end of each of a pair of links 8. The other ends of these links are attached by means of a suitable pivot 9 to one end of a link 10 and to one end of a link 12. The other end of the link 10 is pivoted between a pair of bars 4' at point 11. The bars 4' are attached to the body frame between the side bars 4. The other end of link 12 is pivoted to one end of a shaft 13.

There are two sets of these two-lever mechanisms, one on each side of the body, and are similarly operated and both connected to the shaft 13 so that whenever this shaft 13 moves the lever mechanism is operated to dump or lower the body. On each end of the shaft is a hook 13a, engaging the trackway to hold the roller thereon.

Adjacent each link 12, on its pivot shaft 13, is a roller 14 on the shaft 13. In order to support these rollers, a trackway 15 is provided for each roller. These trackways are slightly inclined downward toward the front of the body and supported at each end by means of a cross beam 16. Each bracket 1a is supported at its lower end by the shaft 7, while its upper end is welded to a trackway 15. The lower end of each bracket 1a is braced by a beam 15a attached to one end of the shaft 7 at a bracket 1a, while its other end is welded to a trackway.

For operating the shaft 13 and the link mechanisms, there is provided a piston rod 17 attached at one end to the central part of the shaft 13, while its other end extends into a cylinder 19 and has thereon a piston 18 working within the cylinder. The cylinder is supported in an inclined position at one end by one of the beams 16, and at the other end by means of a beam 20. The cylinder is so positioned that when the piston and the piston rod move thereon, they move in line with the trackways 15, with the outer end of the piston rod 17 supported on the trackways by means of the shaft 13 and the rollers on the end thereof.

Adjacent the lower end of the cylinder is a valve casing 21, which has thereon a valve mechanism for controlling the admission of some hydraulic means into and from the cylinder for purposes of operating the piston and piston rod. From the valve casing, leading into the cylinder, is an inlet 22. This inlet leads into the lower end of the cylinder, while there extends from the rear end of the cylinder an outlet pipe 23. This outlet pipe extends from the rear end of the cylinder to the valve casing so that water or oil, or any other material used for operating the piston, may escape from the rear end back to the valve casing.

There is provided in the piston a passageway adapted to be closed by means of a valve 24, which has a stem 25 extending through the opening. In order to hold this valve 24 normally closed, there is provided a spring 26, around the stem and between the piston and the suitable stock member on the end of the valve stem. There is also provided a dumping gauge stop 27.

A pump, such as is indicated by the numeral 28, may be used for applying hydraulic pressure to the cylinder for operating the piston and piston rod therein.

Figure 2:
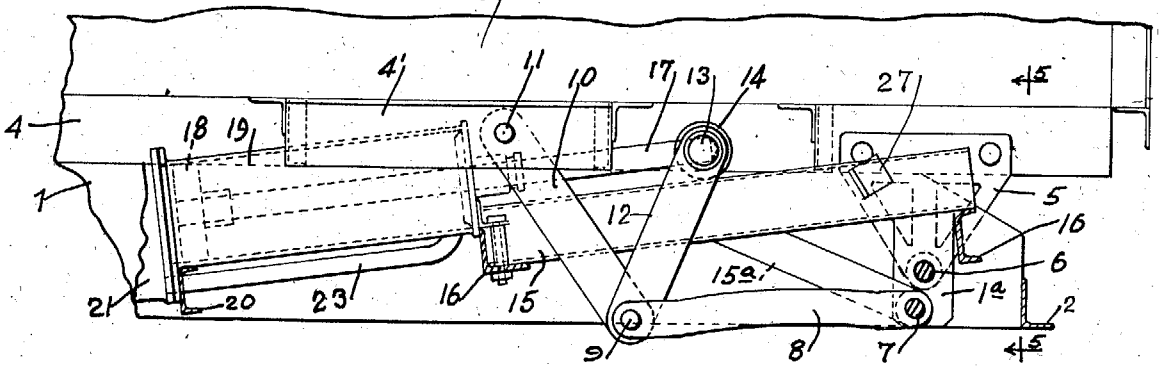
Figure 2 is a longitudinally inverted section through part of the dump body and part of the supporting frame, showing the dumping mechanism.
Figure 3:
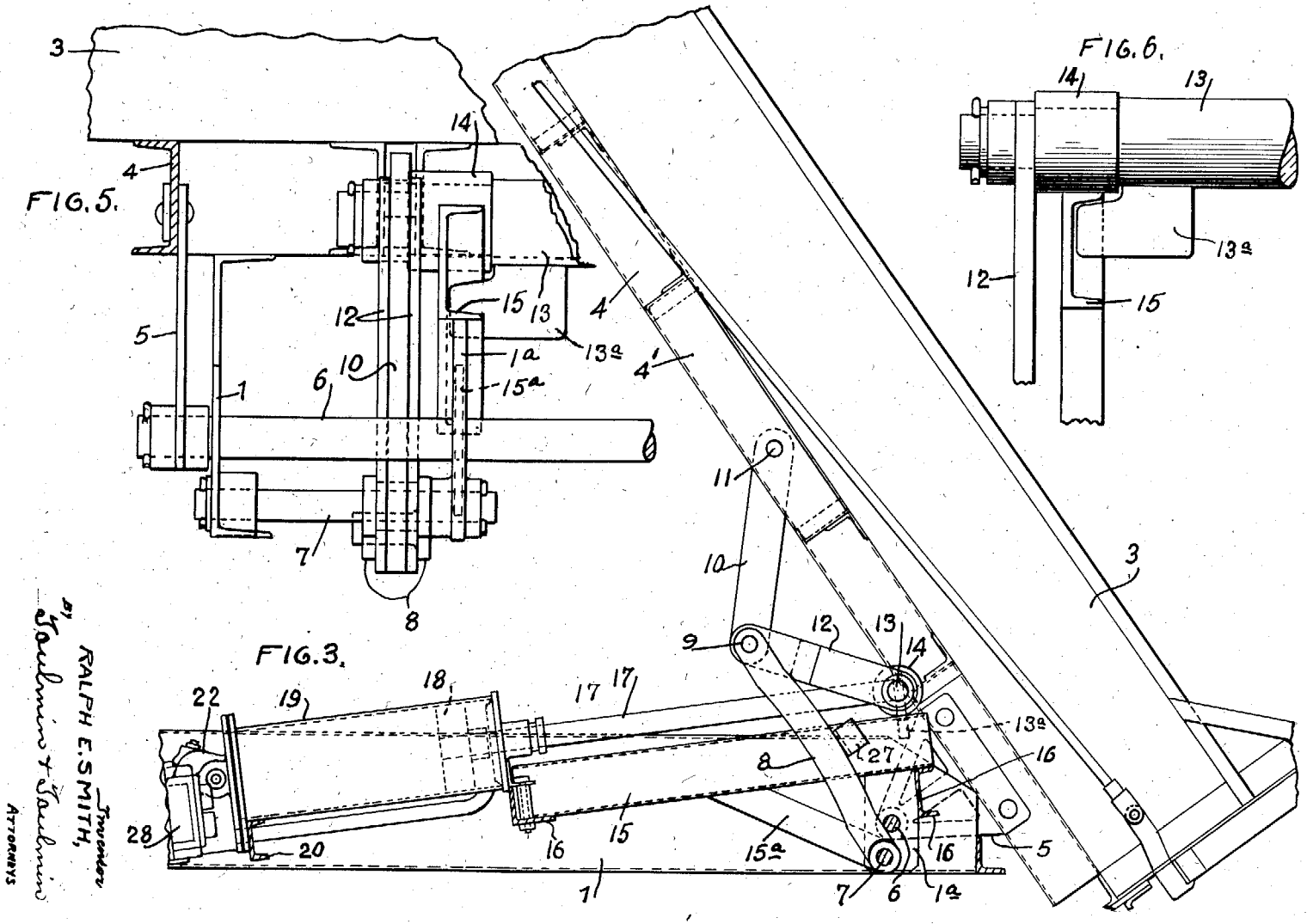
Figure 3 is a side elevation of the dump body in dumping position, and showing the mechanism for positioning the dump body in dumping position.
Figure 4:
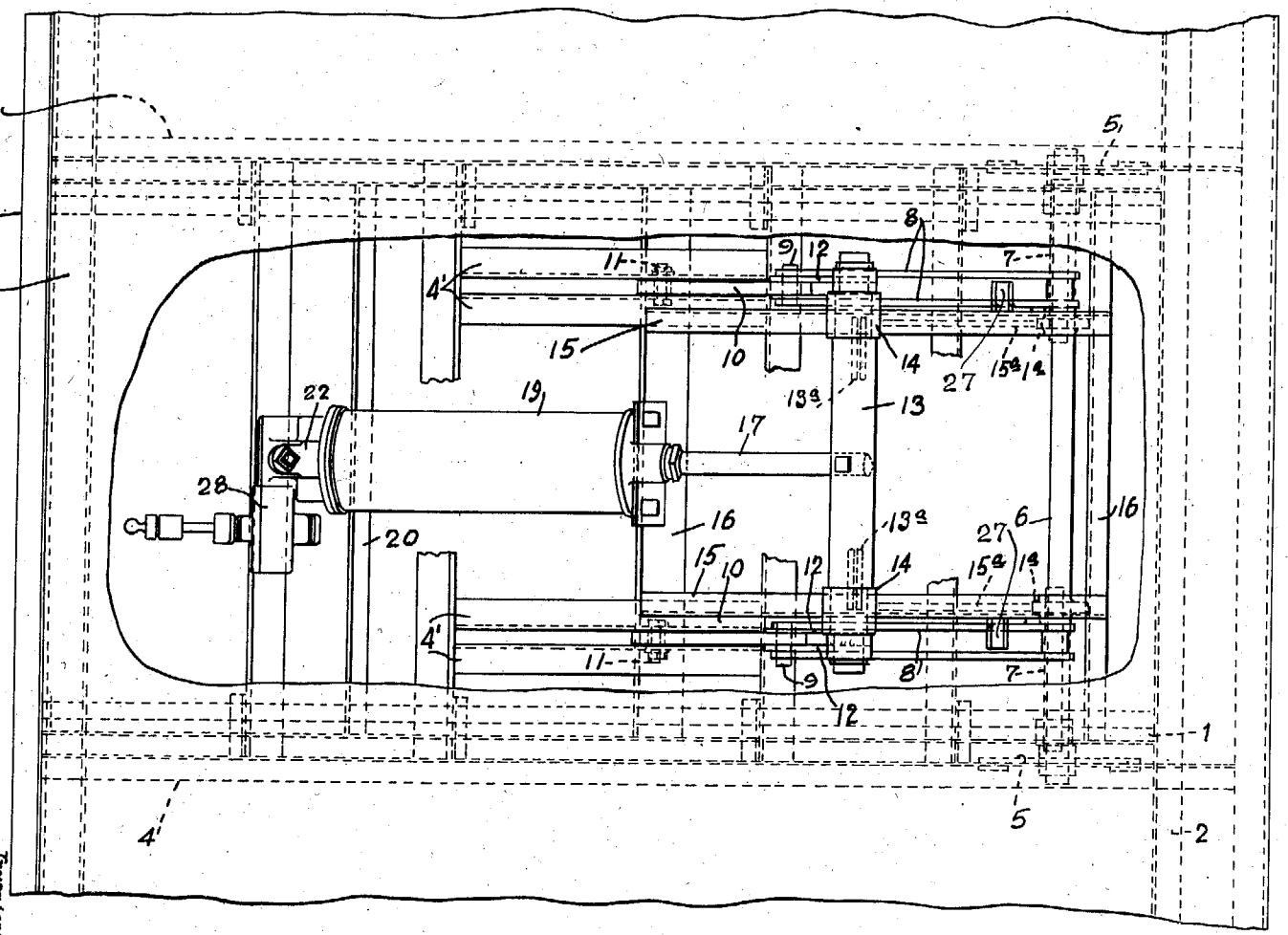
Figure 4 is a top plan view with parts removed to show the dumping mechanism.

In Figure 1, the dump body is shown in horizontal position supported on top of the truck frame, which may be considered a support. In order to cause the body to be hoisted for dumping purposes, a liquid of some kind is forced into the lower end of the cylinder against the piston so that the piston is advanced toward the upper end of the cylinder, carrying with it the piston rod and shaft 13. This causes the links 12 to move toward the rear, thereby bringing the links 8 and 10 more nearly in line with each other and elevating at the same time these links from a position such as shown in Figures 1 and 2 to a position shown in Figure 3. This action of the piston 17 on the links 12 has both a simple lever action and also a toggle action. It is to be observed that the shaft for operating the links 12 always moves in a single plane so that there is a direct application of power along one line.

I desire to comprehend within my invention such modifications as may be embraced within my claims and the scope of my invention.

Having thus fully described my invention, what I claim as new and desire to secure by Letters Patent is:

1. In a hoist, in combination with a supporting member and an object to be hoisted, a system of links attached to the supporting member and to the object to be hoisted, a trackway on the supporting member, and means to operate the links to elevate said object, said means including a cylinder, a piston and piston rod, and rollers on the piston rod engaging the trackway and guided thereby.

2. In a hoist, in combination with the supporting member and an object to be hoisted, a pair of links attached to each other and to the supporting member and the object to be hoisted, and means connected to the links where they are attached to each other and movable in a line substantially parallel to the links attached to the supporting member when the links are in non-hoisting positions to operate the levers to elevate the object to be hoisted.

3. In a hoist, in combination with a supporting member and an object to be hoisted, a pair of links pivoted to each other at one end and having their other ends attached to the supporting member and the object to be hoisted, respectively, a link connected at one end to one of said links, means engaging the other end of said link for operating said link, and stationary means to guide the last-named means in a straight line substantially parallel to the first lever when the body is in non-dumping position.

4. In a hoist, in combination with a supporting member and an object to be hoisted, a pair of links pivoted to each other at one end and having the other end of one link attached to the supporting member and the other end of the other link attached to the object to be hoisted, a link attached at one end to said links, a roller on the other end of the last-mentioned link, a stationary guide for said roller, and means to cause said roller to travel along said guide whereby the links are operated and the object to be hoisted is elevated.

5. In a hoist, in combination with the supporting member and an object to be hoisted pivoted to said supporting member, a pair of links pivoted at one end to each other and having the other end of one link pivoted to the supporting member and the other end of the other link pivoted to the object to be supported, a stationary trackway, a traveling member on said trackway, means connecting said links to said traveling member, and means to cause said traveling member to move on the trackway whereby the links are operated and the object hoisted.

6. In a hoist, in combination with a supporting member and an object to be hoisted, a system of links attached to the supporting member and to the object to be hoisted, a trackway, and means movable along the trackway to operate the links to elevate said object, said means including a shaft having rollers engaging the trackway and links connected to the first-mentioned links.

7. In a dump body, in combination with a supporting frame to which one end of the dump body is pivoted, a link pivoted at one end to said frame, a second link pivoted at one end to the dump body, means connecting the other ends of said links, a link attached to said means at one end, and means to cause the other end of said link to move in a straight line substantially parallel to the first link when the body is in non-dumping position for operating the links to dump the body.

8. In a dump body, in combination with a frame to which one end of the body is pivoted, a link on each side of the frame pivoted at one end to the frame, a second link on each side of the dump body pivoted at one end to the dump body, means pivotally connected to the ends of said links and a link attached at one end to said last-named means, and means engaging the other end of the last-named link to cause it to travel in a straight line substantially parallel to the first link when the body is in non-dumping position, whereby the links are operated and the body dumped.

9. In a hoisting apparatus, a supporting frame, a body, a pair of links on each side of the frame, one end of each link of one pair of links attached to one side of the frame and one end of each of the links of the other pair of links being attached to the other side of the frame, a single link attached at one end to each side of the body, the other ends of each single link being attached to the free ends of one pair of links, and means acting in a plane substantially parallel to the pairs of links when the body is in non-dumping position to operate all of said links.

10. In a hoisting apparatus, a supporting frame, a body, a pair of links on each side of the frame, one end of each link of one pair of links being attached to one side of the frame and one end of each of the links of the other pair of links being attached to the other side of the frame, a single link on each side of the body attached at one end to the body, pivots by which the other ends of all the links are connected, a trackway on the frame, and means movable on the trackway connected to the pivots for operating the links to hoist the body.

11. In a hoisting apparatus, a supporting frame, a body, a pair of links on each side of the frame, one end of each link of one pair of links being attached to one side of the frame and one end of each of the links of the other pair of links being attached to the other side of the frame, a single link on each side of the body attached at one end to the body, pivots by which the other ends of all the links are connected, a trackway on the frame, and means movable on the trackway connected to the pivots for operating the links to hoist the body, said means including a shaft having rollers engaging the trackway.

12. In a hoisting apparatus, a supporting frame, a body, a pair of links on each side of the frame, one end of each link of one pair of links being attached to one side of the frame and one end of each of the links of the other pair of links being attached to the other side of the frame, a link on each side of the body attached at one end to the body, pivots by which the other ends of all the links are connected, a trackway on the frame, a shaft having rollers on said trackway, links connecting said shaft and pivots, and means to move said shaft and rollers along the trackway to operate the links, whereby the body is hoisted.

13. In a hoist, in combination with a supporting member and an object to be hoisted, link means attached to the supporting member and to the object to be hoisted, a trackway on the supporting member, and means to operate the link means to elevate said object, said means to operate said link means including a cylinder, a piston and piston rod, and rollers on the piston rod engaging the trackway and guided thereby.

RALPH E. SMITH.